United States Patent [19]

Yoshihiro et al.

[11] Patent Number: 5,461,519
[45] Date of Patent: Oct. 24, 1995

[54] RECORDING AND REPRODUCING APPARATUS WITH HELICAL SCAN TRACKING

[75] Inventors: Mitsugu Yoshihiro; Yasuo Iwasaki, both of Kanagawa, Japan

[73] Assignee: Sony Corporation, Tokyo, Japan

[21] Appl. No.: 991,265

[22] Filed: Dec. 16, 1992

[30] Foreign Application Priority Data

Dec. 20, 1991 [JP] Japan .................................... 3-355323

[51] Int. Cl.[6] .......................... G11B 21/04; G11B 5/584
[52] U.S. Cl. ...................... 360/70; 360/73.12; 360/77.13
[58] Field of Search ................................ 360/718, 27, 70, 360/73.04, 73.11, 73.12, 77.13, 77.15, 77.14, 32

[56] References Cited

U.S. PATENT DOCUMENTS

| | | | |
|---|---|---|---|
| 4,539,606 | 9/1985 | Itoh | 360/70 |
| 4,802,032 | 1/1989 | Tatsuzawa et al. | 360/77.13 |
| 4,839,755 | 6/1989 | Yamada et al. | 360/77.14 |
| 4,951,162 | 8/1990 | Yoshimura et al. | 360/73.11 X |
| 4,984,104 | 1/1991 | Takahashi et al. | 360/77.14 |
| 5,095,394 | 3/1992 | Yanagihara | 360/77.14 |
| 5,276,568 | 1/1994 | Murata et al. | 360/70 |

FOREIGN PATENT DOCUMENTS

3943218A1 12/1989 Germany.

*Primary Examiner*—Aristotelis Psitos
*Assistant Examiner*—Varsha A. Kapadia
*Attorney, Agent, or Firm*—William S. Frommer; Alvin Sinderbrand

[57] ABSTRACT

A digital tape recording and reproducing apparatus includes a rotary drum, a magnetic tape helically wrapped around the rotary drum, a mechanism for advancing the magnetic tape relative to the rotary drum, and a recording/reproducing magnetic head mounted on the drum which scans the magnetic tape for recording or reproducing digital signals. The digital signals are recorded in, or reproduced from, successive inclined tracks formed on the tape as the tape is advanced. During recording of the signals, a timing signal is generated at a predetermined interval of time after detection of a reference signal that represents a phase of rotation of the drum, and then the timing signal is recorded in at least one of the inclined tracks, interspersed with the digital signals recorded in the track. During reproduction of signals from the tape, the drum phase reference signal is detected and the timing signal is reproduced and detected, and the time interval between detection of the two signals is measured. The mechanism for advancing the tape is controlled on the basis of the measured interval so that the magnetic head properly scans the recorded tracks.

14 Claims, 6 Drawing Sheets

RECORDING AND REPRODUCING APPARATUS WITH HELICAL SCAN TRACKING

BACKGROUND OF THE INVENTION

1. Field of Invention

This invention relates to digital video tape recorders (VTRs), and more particularly is directed to a tracking control system for a VTR.

2. Description of the Prior Art

In conventional helical-scan VTRs it is known to record a tracking control signal in a longitudinal track on the magnetic tape. A VTR of this type is semi-schematically shown in FIG. 7, in which reference numeral 30 generally designates the VTR.

Figure 7:
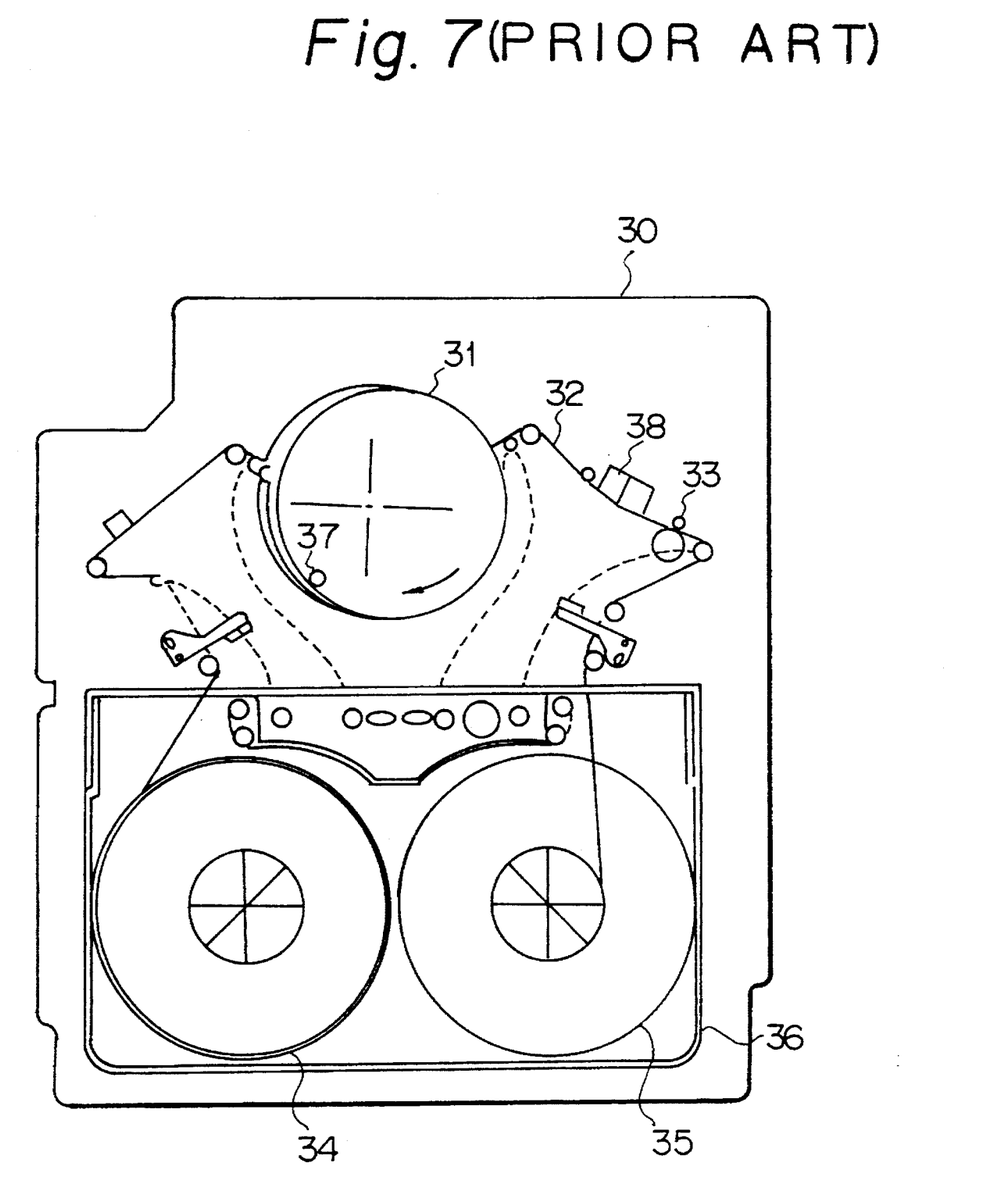
FIG. 7 is a semi-schematic plan view of a conventional VTR.

VTR 30 includes a rotary drum 31 about which a magnetic recording tape 32 is helically wrapped. Tape 32 is advanced by a capstan 33, and is supplied from and taken up by, respectively, reels 34 and 35 of a tape cassette 36. A magnetic recording and reproducing head 37 is mounted on rotary drum 31 and scans tape 32 as tape 32 is advanced. During recording, magnetic head 37 forms inclined tracks in which the video signals are recorded on tape 32. During reproduction, magnetic head 37 scans the previously recorded tracks to reproduce the video signals. A fixed head 38 is used for recording and erasing cue and control signals, and the like, in a longitudinal track on tape 32 that is separate from the inclined video signal recording tracks.

Figure 8:
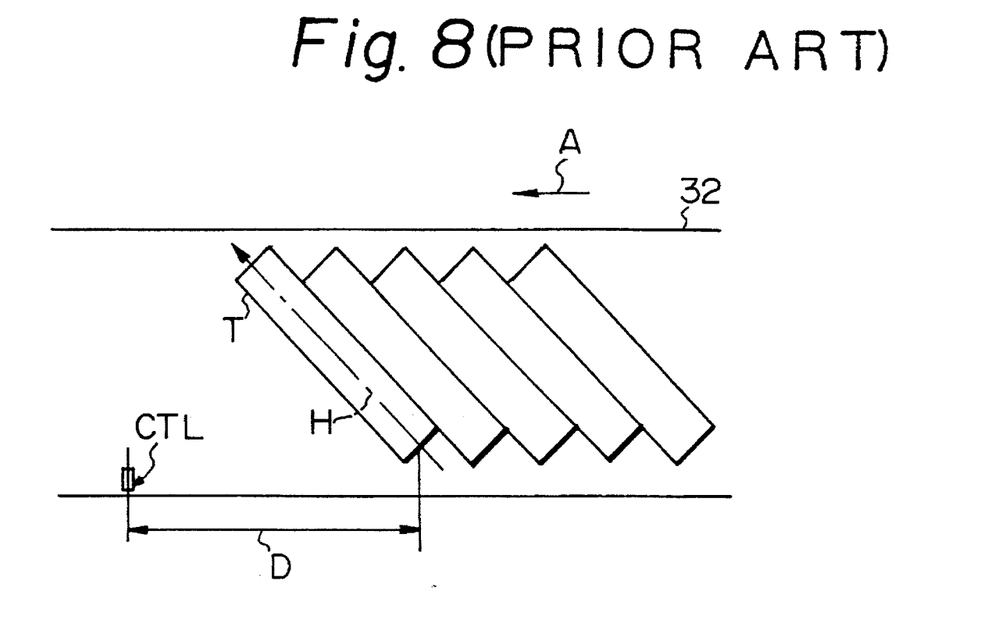
FIG. 8 shows a recording format used in the conventional VTR of FIG. 7.

FIG. 8 shows a signal recording format used in VTR 30 of FIG. 7. In FIG. 8, arrow A indicates the direction in which tape 32 is advanced. Inclined tracks T are scanned by magnetic head 37 in a direction indicated by arrow H. Control signals CTL are recorded by head 38 in a longitudinal track of tape 32. Tracking control is performed on the basis of an interval between the time at which a reference signal (not shown) is detected and the time at which the control signal CTL is detected.

The time interval between detection of the reference signal and detection of the control signal CTL is a function of the distance D between the beginning of track T and the location of control signal CTL. However, the distance D is subject to variation due to such factors as deterioration of tape 32 on account of age, variations in the tension in tape 32 during recording, and inconsistency in the performance of the tape transport mechanism. Since the conventional tracking control technique is based on maintaining a constant interval between detection of the reference and control signals, variations in the distance D may result in tracking control errors. A further disadvantage of the conventional track following system used in the VTR of FIG. 7 is the need to provide the fixed head 38.

Another known tracking control technique is referred to as the "ATF" system and is used in the 8 mm format VTR. In the ATF system, pilot signals are recorded in the helical tracks. Tracking control is based on the relative strength of cross-talk signals produced from pilot signals in adjacent tracks on either side of a track that is being scanned. In particular, the system adjusts the head scanning locus so as to equalize cross-talk signals received from the respective adjacent tracks. However, variations in the recording and reproducing efficiency of the signal recording and reproducing head again may result in tracking errors.

OBJECTS AND SUMMARY OF THE INVENTION

Accordingly, it is an object of the present invention to provide a tracking control system that is not subject to the tracking control errors experienced with conventional systems and that does not require recording of a control signal in a longitudinal tape track by a fixed head.

In accordance with an aspect of the present invention, a digital tape recording apparatus includes a rotary drum having a magnetic tape helically wrapped therearound, a recording head mounted on the drum and which scans the magnetic tape to record digital signals on the tape in successive inclined tracks as the tape is advanced, means for detecting a reference signal that represents a phase of rotation of the drum, means responsive to detection of the reference signal for generating a timing signal at a predetermined interval of time after detection of the reference signal, and means for recording the timing signal on the magnetic tape in at least one of the inclined tracks interspersed with the digital signals recorded in the track.

According to another aspect of the invention, a digital tape reproducing apparatus comprises a rotary drum having a magnetic tape helically wrapped therearound; a reproduce head mounted on the drum and which scans the magnetic tape to reproduce digital signals previously recorded on the tape in inclined tracks; means for advancing the magnetic tape relative to the rotary drum; and a tracking control device including means for reproducing a timing signal that was previously recorded with the digital signals in at least one of the inclined tracks, an interval measuring means for receiving a reference signal that represents a phase of rotation of the rotary drum and the reproduced timing signal and for measuring an interval between times when the reference signal is received and when the reproduced timing signal is received, and control means responsive to the interval measuring means for controlling the means for advancing the magnetic tape on the basis of the interval measured by the interval measuring means.

According to still another aspect of the invention, the digital signals comprise fields of digital video signals, each field of digital video signals is divided into a plurality of segments each recorded in a respective one of a like plurality of the inclined tracks, and in each plurality of tracks, the timing signal is recorded in only some of the tracks.

The foregoing tracking control system according to this invention is advantageous in that it is not susceptible to factors such as tape condition, variations in tape transport speed or tension and variations in rotary head efficiency which cause errors in prior art tracking control systems. Also, no fixed head for recording control signals in a longitudinal tape track is required.

The above, and other objects, features and advantages of the present invention will be apparent from the following detailed description thereof which is to be read in connection with the accompanying drawings.

DETAILED DESCRIPTION OF THE PREFERRED EMBODIMENTS

Figure 1:
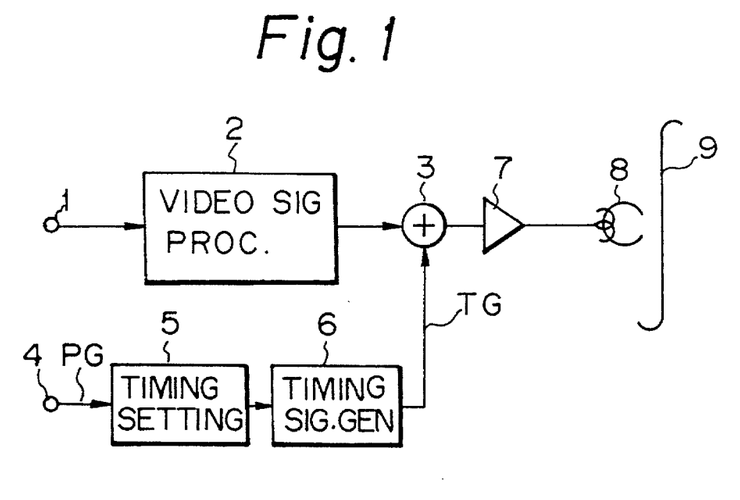
FIG. 1 is a block diagram of a recording section of a digital VTR in accordance with an embodiment of the present invention.

FIG. 1 shows a recording section of a digital VTR in which the tracking control system of the present invention is applied. In FIG. 1, an input digital video signal is provided via an input terminal 1 to a video signal processing circuit 2. A processed digital video signal is supplied by video signal processing circuit 2 to an input of an adding circuit 3.

As is conventional in VTRs, a PG signal that represents the phase of rotation of the rotary drum (not shown in FIG. 1) is generated for the purpose of drum servo control or the like. The PG signal is provided via an input terminal 4 to a timing setting circuit 5. Timing setting circuit 5 detects the PG signal and, at a predetermined interval of time after detection, generates a trigger signal which is provided to timing signal generating circuit 6. Upon receiving the trigger signal, timing signal generating circuit 6 generates a timing signal TG, which is supplied to another input of adding circuit 3. Timing signal TG may be, for example, a sine wave that has a frequency in the range of 100–500 kHz.

Adding circuit 3 adds the timing signal TG to the recording signal received from video signal processing circuit 2, and outputs the resulting combined signal to a rotary head 8 mounted on the VTR's rotary drum. Rotary head 8 records the combined signal on a magnetic recording tape 9. Since timing signal TG is a sine wave that is out of the bandwidth of the video signal, timing signal TG can be frequency-division multiplexed with the video signal.

Figure 2A:
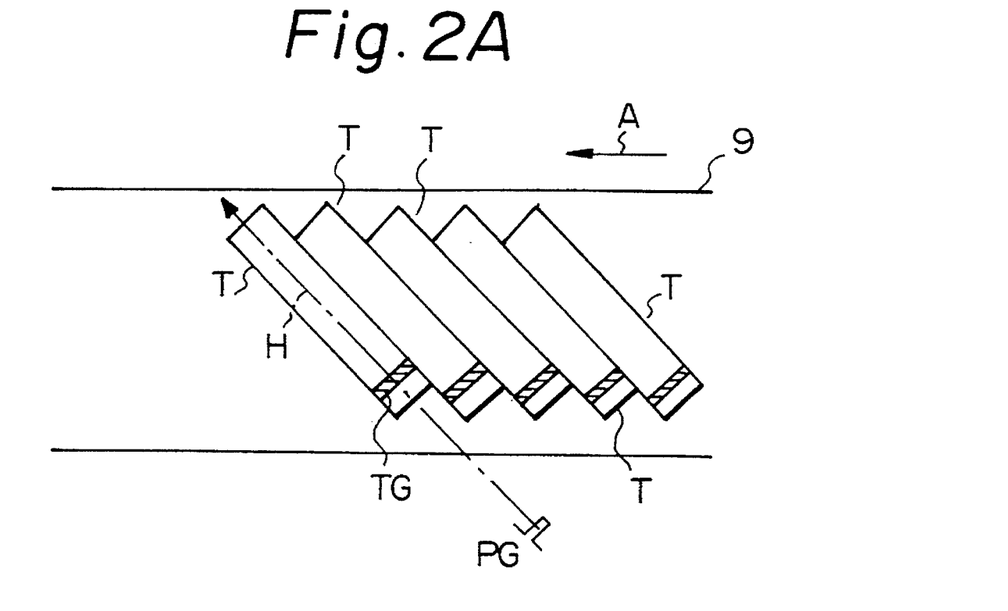
FIGS. 2A–2D illustrate recording track formats used in the VTR of FIG. 1.

FIG. 2A shows in general terms the recording format used in the recording section of FIG. 1. Arrow A shows the direction in which tape 9 is advanced. Rotary head 8 scans magnetic tape 9 in the direction indicated by arrow H to form successive slant tracks T in which the digital video signals are recorded. The timing signal TG is recorded at a position in track T which is determined by the time interval measured by timing setting circuit 5 from detection of the PG pulse signal.

Figures 2B, 2C:
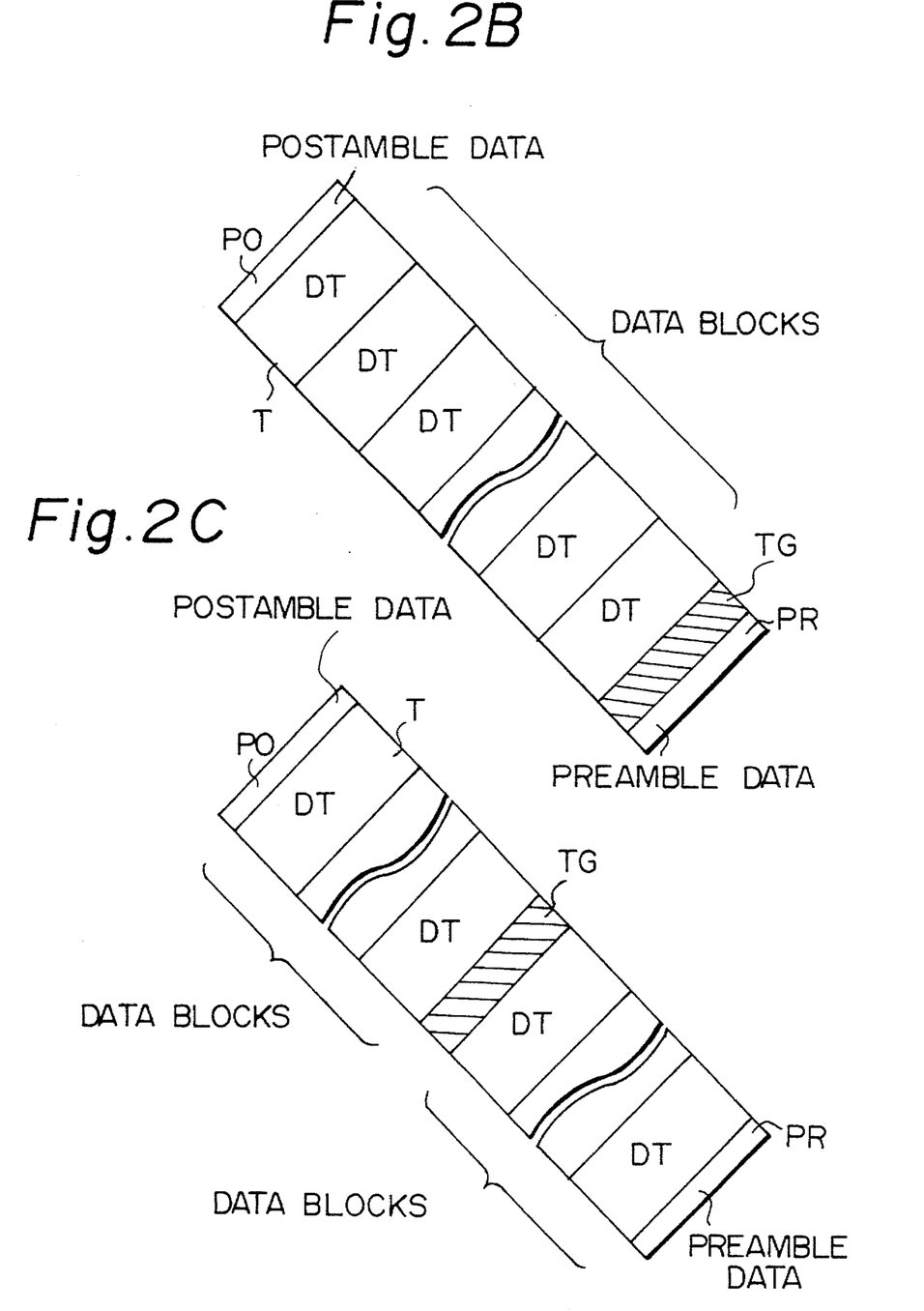

FIG. 2B shows in more detail a format of signals recorded in a track T, and FIG. 2C shows an alternative signal recording format for track T. In FIG. 2B, signals are recorded in the following sections, proceeding in the direction in which the head scans the tape: a preamble data section PR; timing signal TG; a plurality of data blocks DT in which the digital video signal data, or other digital data, is recorded; and a postamble data section PO. In the alternative track format shown in FIG. 2C, the preamble data section PR is followed by a plurality of data blocks DT and then the timing signal TG, which is again followed by a plurality of data blocks DT and then the postamble data section PO. It will be appreciated that the placement of the timing signal TG among data blocks DT as shown in FIG. 2C does not create timing problems, since the timing of reproduction of the digital data can be performed without interference from the timing signal TG. In either of the formats of FIGS. 2B and 2C, the timing signal TG is recorded interspersed with digital signals in track T, as the preamble data PR and the data blocks DT both comprise digital data.

Figure 6:
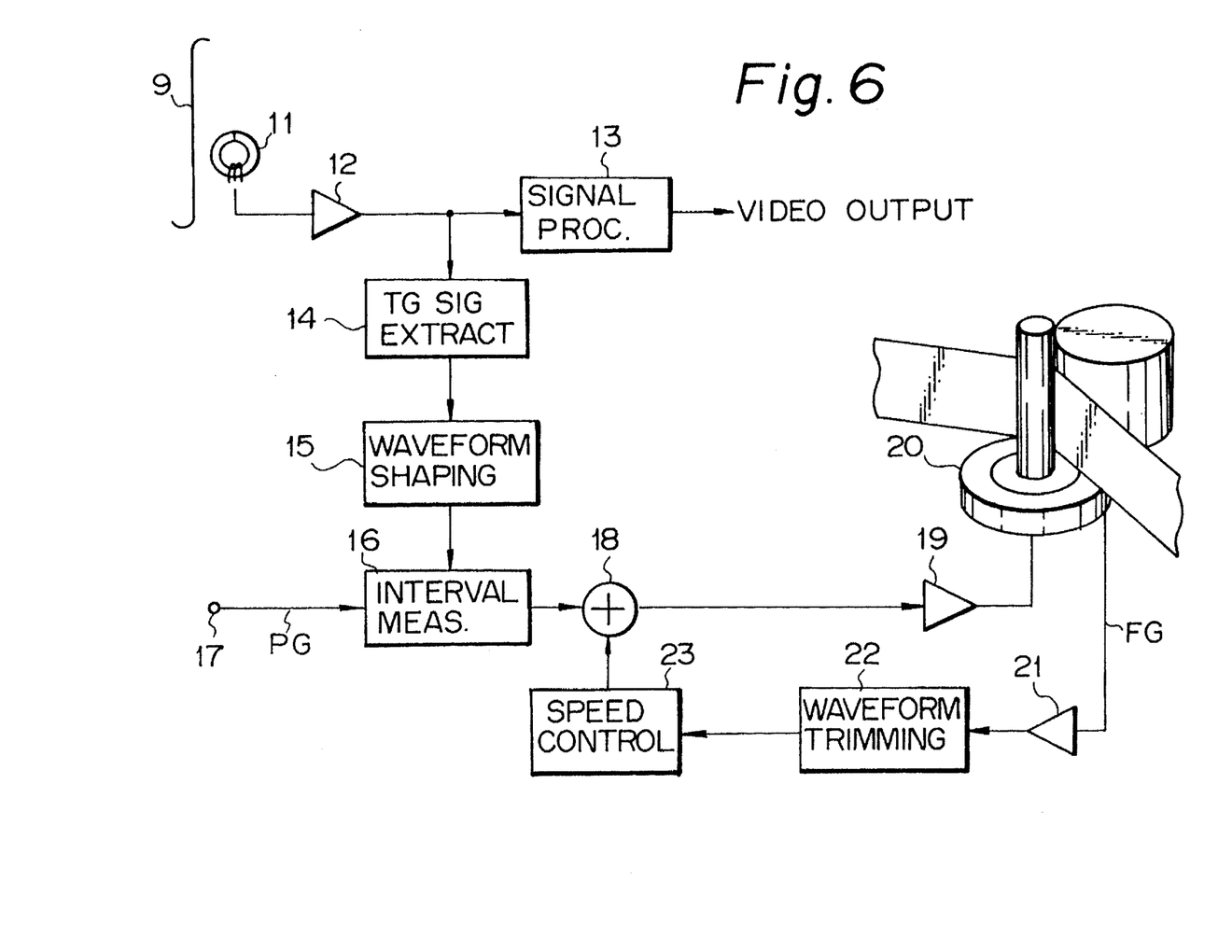
FIG. 6 is a block diagram of a reproducing section of a digital VTR in accordance with an embodiment of the present invention.

FIG. 6 is a block diagram of the reproducing section of a digital VTR in which tracking control is performed using timing signals TG that have been recorded on the tape as described with reference to FIGS. 1 and 2A.

As shown in FIG. 6, a rotary head 11 reproduces the signal recorded on magnetic tape 9 and supplies the reproduced signal to a signal processing circuit 13 through a reproducing amplifier 12. A processed video signal is output by processing circuit 13 for display, etc.

The signal provided through reproducing amplifier 12 is also supplied to a timing signal extracting circuit 14. Timing signal extracting circuit 14 includes a bandpass filter (not separately shown) which allows the frequency of timing signal TG to pass through. The timing signal TG extracted by timing signal extracting circuit 14 is supplied to a waveform shaping circuit 15. Waveform shaping circuit 15 converts the extracted timing signal TG into a digital pulse train, which, in turn, is provided to an interval measuring circuit 16. Interval measuring circuit 16 also receives a PG signal provided at an input terminal 17. As before, the PG signal is a reference signal that represents a phase of rotation of the VTR's rotary drum (not shown in FIG. 6). Interval measuring circuit 16 detects the PG signal and measures an interval from the detection of that signal until the pulse train representing the timing signal TG is received. Interval measuring circuit 16 then outputs a signal based upon the length of the measured interval to an adding circuit 18. The output of adding circuit 18 is supplied as a speed control signal to a capstan motor 20 through an amplifier 19. As will be appreciated by those skilled in the art, capstan motor 20 causes tape 9 to be driven at a speed determined by the speed of rotation of capstan motor 20. As is also well known, an FG signal is generated as capstan motor 20 rotates. The FG signal is supplied to a speed setting circuit 23 via an amplifier 21 and a waveform shaping circuit 22. A signal output by speed setting circuit 23 is provided to adding circuit 18 to provide a servo-control loop for the speed of rotation of capstan motor 20. It will be understood that the signal provided to adding circuit 18 by interval measuring circuit 16 also affects the speed at which capstan motor 20 is rotated, so that the servo-control system for capstan motor 20 performs tracking control on the basis of the signal output of interval measuring means 16.

Figure 2D:
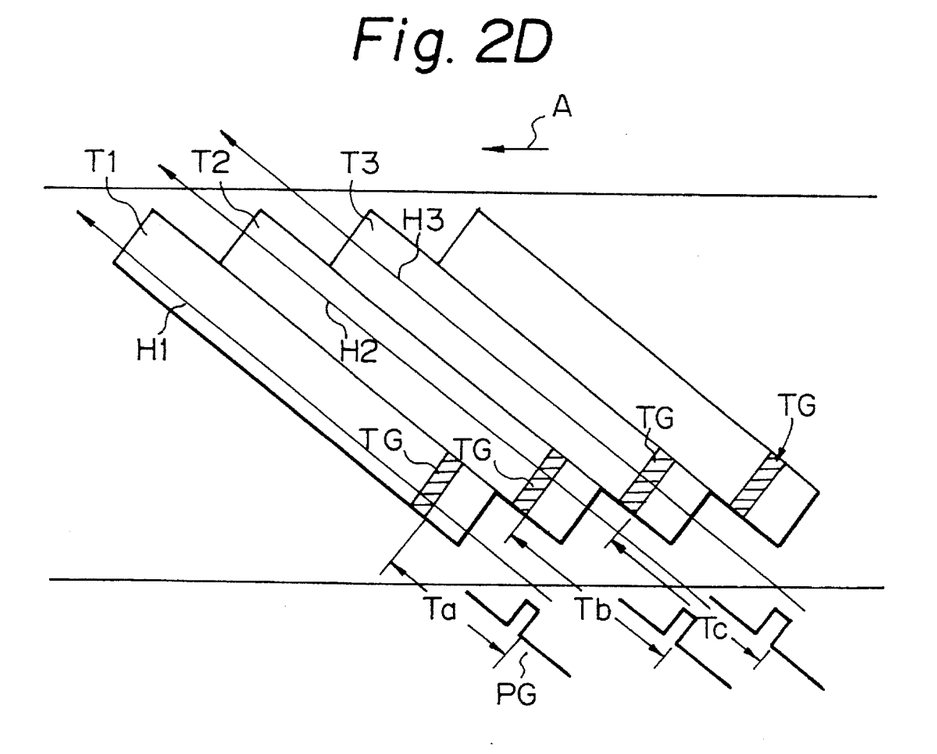
Figure 3:
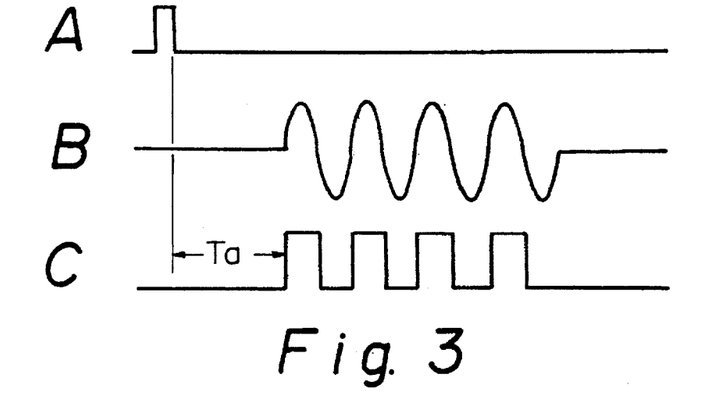
FIGS. 3–5 are signal timing diagrams that illustrate operation of a tracking control system according to the present invention.
Figure 4:
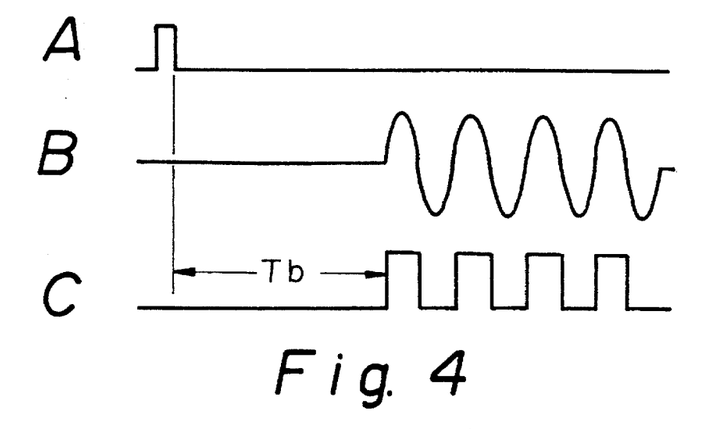
Figure 5:
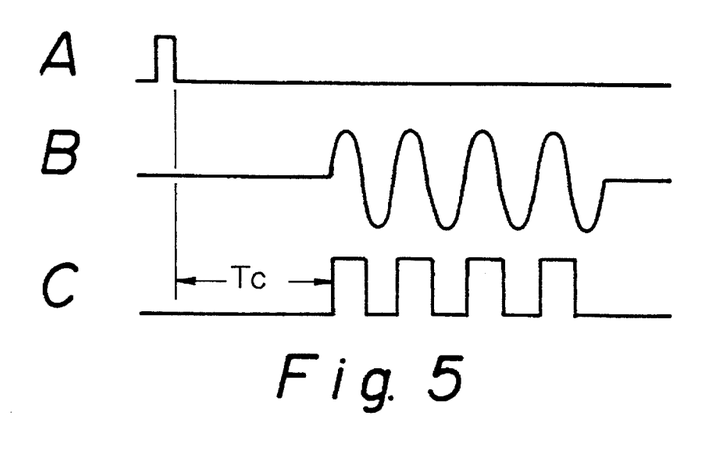

With reference to FIGS. 2D and 3–5, there will be described details of tracking control operations of the reproducing section of FIG. 6. In FIGS. 3–5, each trace A shows the timing of a PG signal received by interval measuring circuit 16, and the traces B show respective timings of timing signals TG extracted by TG signal extractor 14, while the traces C show digital pulse trains formed by waveform shaping circuit 15 from respective extracted timing signals TG. The timings shown in FIGS. 3–5 respectively correspond to head scanning loci H1, H2 and H3 of FIG. 2D.

A desired tracking position of reproducing head 11 is shown by head scanning locus H3 of FIG. 2D. It will be seen that locus H3 longitudinally traverses track T3 at a position that is at the center of track T3 as measured in a direction transverse to track T3. The time interval between the reference pulse signal PG and the timing signal TG with respect to locus H3 is represented by interval Tc, which is also illustrated on FIG. 5.

If the scanning locus of reproducing head 11 is displaced to the left of center, as shown by locus HI in track T1 of FIG. 2D, then the interval between the reference signal PG and the timing signal TG (represented by interval Ta in FIGS. 2D and 3) is shorter than the proper interval Tc. On the other hand, if the head scanning locus is displaced rightwardly from the center of the track as shown by locus H2 in track T2 of FIG. 2D, then the interval between the PG signal and the TG signal, represented by interval Tb in FIGS. 2D and 4, is longer than the desired interval Tc. Accordingly, the reproducing circuitry shown in FIG. 6 adjusts the tape transport speed so that the proper interval Tc is maintained between the reference signal PG and the timing signal TG.

It will be appreciated that the timing at which reference signal PG is produced is not dependent upon the speed at which the magnetic tape is transported during recording or reproduction, so that factors such as aging of the tape, variations in tape tension, or inconsistency in the performance of the tape transport system, have no effect on the timing of reference signal PG. Therefore, the tracking control system as described herein does not suffer from tracking errors of the type experienced with the prior art tracking control systems mentioned above. Further, since no reference signal is recorded in a longitudinal track of the tape, there is no need to provide a fixed head for tracking control purposes.

Although the signal format illustrated in FIGS. 2A and 2D has a timing signal TG recorded in every track T, it should be noted that the present invention can also be used with a format in which a timing signal TG is recorded only in some of the inclined tracks. For example, the tracking control system of the present invention can be applied in a digital video recording format in which each field of video signals is divided into several segments and each segment is recorded in a respective inclined track. In such a format the timing signal may be recorded in fewer than all of the tracks, for example in one track, for each field.

It should be noted that the present invention can be applied to VTRs which have one or more than one magnetic head mounted on the rotary drum, including VTRs in which two or more heads simultaneously scan the magnetic tape. Further, the present invention can be applied to helical-scan digital audio recording systems or other non-video digital recording systems.

Having described specific embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A digital tape recording apparatus comprising:

a rotary drum having a magnetic tape helically wrapped therearound;

a record head mounted on said drum and scanning the magnetic tape for recording digital signals on the tape in successive inclined tracks as the tape is advanced;

means for providing a reference signal pulse that represents a phase of rotation of said drum;

means responsive to said reference signal pulse for providing a timing signal pulse only at a predetermined interval of time after occurrence of said reference signal pulse, said timing signal pulse comprising a sine wave having a frequency that is out of a bandwidth of the digital signals; and means for recording said timing signal pulse on said magnetic tape in at least one of said inclined tracks interspersed with the digital signals recorded in said at least one track.

2. A digital tape recording apparatus according to claim 1; wherein:

said digital signals comprise fields of digital video signals; each said field of digital video signals is divided into a plurality of segments each recorded in a respective one of a like plurality of said inclined tracks; and in each said plurality of inclined tracks, said timing signal pulse is recorded in only some of the tracks.

3. A digital tape recording apparatus according to claim 1; wherein said timing signal pulse is a sine wave having a frequency in the range of 100–500 kHz.

4. A digital tape recording apparatus according to claim 1, wherein said means for recording is operable to record said timing signal pulse on said magnetic tape in an area of said at least one of the inclined tracks separate from locations at which said digital signals are recorded.

5. A digital tape reproducing apparatus comprising:

a rotary drum;

a magnetic tape helically wrapped around said rotary drum, and having digital signals previously recorded on the tape in inclined tracks and a timing signal pulse recorded with said digital signals in at least one of said inclined tracks only at a predetermined position along the respective one of said tracks;

a reproduce head mounted on said drum and scanning the magnetic tape for reproducing said digital signals and timing signal pulse previously recorded on the tape in inclined tracks;

means for advancing the magnetic tape relative to said rotary drum; and a tracking control device including means for extracting said timing signal pulse that was reproduced with said digital signals from said at least one of said inclined tracks;

means for providing a reference signal pulse that represents a phase of rotation of said head with said drum;

interval measuring means for receiving said reference signal pulse that represents a phase of rotation of said drum and the extracted timing signal pulse and for measuring an interval of time between a time when said reference signal pulse is received and a time when said extracted timing signal pulse is received; and control means responsive to said interval measuring means for controlling said means for advancing the magnetic tape on the basis of said interval of time measured by said interval measuring means.

6. A digital tape reproducing apparatus according to claim 5; wherein said means for advancing the tape includes a capstan motor.

7. A digital tape reproducing apparatus according to claim 5; wherein said extracted timing signal pulse is a sine wave having a frequency in the range of 100–500 kHz and said interval measuring means includes a waveform shaping circuit that converts said reproduced timing signal pulse into a digital pulse train.

8. A digital tape recording apparatus according to claim 5, wherein said reproduce head reproduces said digital signals from said inclined tracks one track at a time and reproduces said timing signal pulse only from said one track from which said digital signals are reproduced.

9. A digital tape recording apparatus according to claim 5, wherein said control means controls said means for advancing so as to advance the magnetic tape on the basis of said measured interval of time independent of the relative value of said extracted timing signal pulse.

10. A digital tape recording and reproducing apparatus comprising:

a rotary drum;

a magnetic tape helically wrapped around said rotary drum;

means for advancing the magnetic tape relative to said rotary drum;

a magnetic recording and reproducing head mounted on said drum and scanning the magnetic tape for recording digital signals on the tape, and reproducing digital signals from the tape, in successive inclined tracks as the tape is advanced;

means for providing a reference signal pulse that represents a phase of rotation of said head with said drum;

means responsive to said reference signal pulse for providing a timing signal pulse only at a predetermined interval of time after occurrence of said reference signal pulse, said timing signal pulse comprising a sine wave having a frequency that is out of a bandwidth of the digital signals;

means for recording said timing signal pulse on said magnetic tape in at least one of said inclined tracks interspersed with the digital signals recorded in said at least one track;

means for reproducing said digital signals and said timing signal pulse previously recorded in said at least one of said inclined tracks;

means for extracting said timing signal pulse from said digital signals reproduced therewith from said at least one of said inclined tracks;

interval measuring means for receiving said reference signal pulse and the extracted timing signal pulse and for measuring an interval of time between a time when said reference signal pulse is received and a time when said extracted timing signal pulse is received; and control means responsive to said interval measuring means for controlling said means for advancing the magnetic tape on the basis of said interval of time measured by said interval measuring means.

11. A digital tape recording and reproducing apparatus according to claim 10; wherein:

said digital signals comprise fields of digital video signals; each said field of digital video signals is divided into a plurality of segments each recorded in a respective one of a like plurality of said inclined tracks; and in each said plurality of inclined tracks, said timing signal pulse is recorded in only some of the tracks.

12. A digital tape recording and reproducing apparatus according to claim 10; wherein said timing signal pulse is a sine wave having a frequency in the range of 100–500 KHz.

13. A digital tape recording and reproducing apparatus according to claim 10, wherein said means for advancing the tape includes a capstan motor.

14. A digital tape recording and reproducing apparatus according to claim 10, wherein said means for recording is operable to record said timing signal pulse on said magnetic tape in an area of said at least one of the inclined tracks separate from locations at which said digital signals are recorded.

* * * * *